United States Patent
Creech

(10) Patent No.: US 6,247,208 B1
(45) Date of Patent: Jun. 19, 2001

(54) METHOD AND APPARATUS FOR TIGHTENING A BELT, STRAP, OR THE LIKE

(76) Inventor: Cecil Creech, 6121 Shadyside Rd., Shadyside, MD (US) 20764

( * ) Notice: Subject to any disclaimer, the term of this patent is extended or adjusted under 35 U.S.C. 154(b) by 0 days.

(21) Appl. No.: 09/350,903

(22) Filed: Jul. 12, 1999

(51) Int. Cl.$^7$ .............................. A44B 21/00; B25B 25/00
(52) U.S. Cl. ................... 24/68 BT; 24/68 R; 24/68 CD; 24/909
(58) Field of Search ........................... 24/68 BT, 68 CD, 24/68 D, 68 R, 265 B, 909

(56) References Cited

U.S. PATENT DOCUMENTS

| | | |
|---|---|---|
| 604,302 | 5/1898 | Clark . |
| 624,524 | 5/1899 | Olinger . |
| 1,386,918 | 8/1921 | Westrup et al. . |
| 3,754,733 * | 8/1973 | Foster ................................. 24/68 R |
| 3,881,694 * | 5/1975 | Gardner .............................. 24/68 R |
| 4,510,652 * | 4/1985 | Van Iperen ........................... 24/909 |
| 4,592,592 | 6/1986 | Peek . |
| 4,604,773 | 8/1986 | Weber et al. . |
| 4,796,919 | 1/1989 | Linden . |
| 4,832,367 | 5/1989 | Lisenby . |
| 5,005,910 | 4/1991 | Itkis et al. . |
| 5,088,161 | 2/1992 | Robertson . |
| 5,154,446 | 10/1992 | Blake . |
| 5,181,670 | 1/1993 | Eaton et al. . |
| 5,201,099 | 4/1993 | Campbell . |
| 5,215,333 | 6/1993 | Knight . |
| 5,402,958 | 4/1995 | Mahaney . |
| 5,476,288 | 12/1995 | Simodi, Jr. . |
| 5,579,561 | 12/1996 | Smith et al. . |
| 5,692,806 | 12/1997 | Jones . |
| 5,716,097 | 2/1998 | Peck et al. . |
| 6,047,451 * | 4/2000 | Berger et al. ..................... 24/68 CD |

* cited by examiner

*Primary Examiner*—Victor N. Sakran
(74) *Attorney, Agent, or Firm*—Burns, Doane, Swecker & Mathis, LLP

(57) ABSTRACT

The present invention is directed to providing a simple, cost effective device for tightening a restraining device such as a belt, strap, rope or the like that requires very little space, and that can be easily operated to provide complete tightening of the restraining device, even when the restraining device is in a difficult to reach area. Exemplary embodiments can be configured as a unitary structure wherein arms of the unitary structure are each slotted and attached to a base of the unitary structure so that a belt can be easily inserted into the slots. The unitary structure can then be used to clamp the restraining device, such as a seat belt used to hold a child safety seat, in place. Tightening of the belt can be achieved through the use of a removable lever that tightens the belt with each rotation. Upon tightening of the belt to a desired tension, a secure locking mechanism, such as a nut, can be used to hold the belt in its tightened state without concern of belt slippage.

16 Claims, 3 Drawing Sheets

METHOD AND APPARATUS FOR TIGHTENING A BELT, STRAP, OR THE LIKE

BACKGROUND OF THE INVENTION

1. Field of the Invention

The present invention relates to a method and apparatus for assisting in proper engagement of restraining devices. More particularly, the invention relates to the tightening of restraining devices such as belts, straps, ropes or the like, including, but not limited to vehicle seat belts used to hold a child safety seat in place.

2. Background Information

Devices for tightening restraining devices, such as belts, straps, ropes or the like, are well known, but suffer a variety of deficiencies. For example, U.S. Pat. No. 4,604,773 is directed to an automobile seat belt tightener. The described seat belt tightener is configured to engage a seat belt used to hold a child safety seat in place within a vehicle. The device mounts to the seat belt, and is tightened using a tightener mechanism that includes a non-circular bifurcated pin or reel and a complementary, non-circular aperture in the tightener frame to ensure that the pin or reel cannot be rotated until the pin or reel is fully inserted in the frame.

A ratcheting mechanism is used in the device of the '773 patent to lock the tightened belt in place. However, because ratcheting mechanisms are susceptible to slippage, such a device will not necessarily comply with National Transportation Safety Board (NTSB) standards. Moreover, the use of the ratcheting mechanism disclosed in the '773 patent adds to the complexity of the device. In addition, the use of a knob as disclosed in the '773 patent for tightening the belt does not provide adequate leverage to the user, thereby rendering installation in difficult to reach places (such as the center rear seat of a vehicle) impractical.

In addition, the device described in the '773 patent is configured as a U-shaped frame for receiving the pin or reel, the pin or reel being configured with a slot therein for receiving the seat belt. Thus, the pin or reel must be inserted into the frame with each use, and therefore care must be taken to guide the slot through the belt so that the belt can be subsequently tightened. Such an operation requires use of both hands and is difficult to implement, particularly when the seat belt tightener is being used in a difficult to reach area. Other known devices which are more simple in design than that described in the '773 patent, are difficult to install, or if easily installed, do not lend to adequate tightening of the belt.

Accordingly, it would be desirable to provide a relatively simple device, which is easy to install and which can provide adequate tension of a restraining device such as a belt, strap or the like in an easy-to-use operation.

SUMMARY OF THE INVENTION

The present invention is directed to providing a simple, cost effective device for tightening a restraining device such as a belt, strap, rope or the like that requires very little space, and that can be easily operated to provide complete tightening of the restraining device, even when the restraining device is in a difficult to reach area. Exemplary embodiments can be configured as a unitary structure wherein arms of the unitary structure are each slotted and attached to a base of the unitary structure so that a belt can be easily inserted into the slots. The unitary structure can then be used to clamp the restraining device, such as a seat belt used to hold a child safety seat, in place. Tightening of the belt can be achieved through the use of a removable lever that tightens the belt with each rotation. Upon tightening of the belt to a desired tension, a secure locking mechanism, such as a nut, can be used to hold the belt in its tightened state without concern of belt slippage.

Generally speaking, exemplary embodiments relate to an apparatus for tightening a restraining device, such as a belt, strap, rope or the like, comprising: a unitary structure having a generally U-shaped configuration formed by a base with two arms, each of said arms including a slot to receive the restraining device, at least one of said arms being rotatable relative to a remaining portion of said unitary structure; and a locking device for selectively retaining said at least one rotatable arm in a fixed rotational position relative to said base.

BRIEF DESCRIPTION OF THE DRAWINGS

Other objects and advantages of the present invention will become more apparent to those skilled in the art upon reading the detailed description of the preferred embodiments, wherein like elements have been designated by like numerals, and wherein.

DETAILED DESCRIPTION OF THE PREFERRED EMBODIMENTS

Figure 1A:
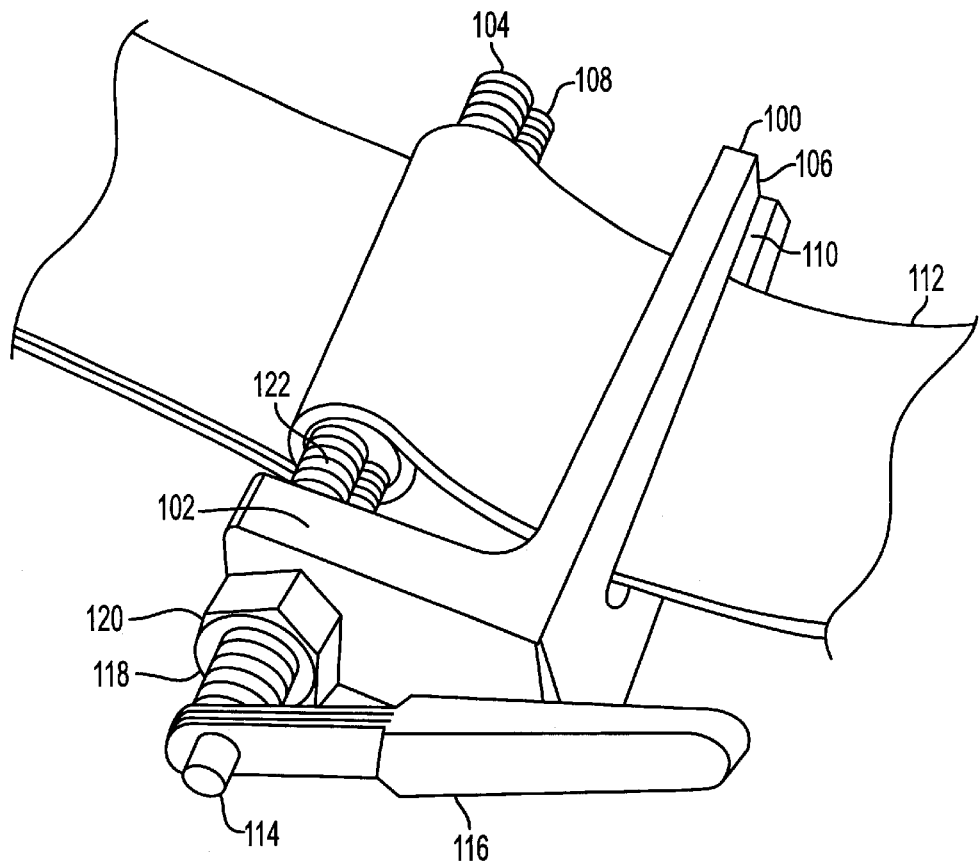
FIGS. 1A and 1B show exemplary embodiments of an apparatus configured in accordance with the present invention for tightening a belt.

FIG. 1A shows an exemplary apparatus for tightening a restraining device in accordance with the present invention. The FIG. 1A apparatus is configured as a unitary structure 100 having a generally U-shaped configuration formed with a base 102 and two arms 104 and 106. Each of the two arms includes a slot 108 and 110, respectively, to receive the restraining device. In the FIG. 1A example, the restraining device 112 is a belt, such as the seat belt of a vehicle used, for example, to hold down a child safety seat.

In the FIG. 1A embodiment, the arm 104 is rotatable relative to a remaining portion of the unitary structure 100. The arm 104 extends through an aperture in the base 102 for rotation by the user. Bearings can be included in the aperture to improve rotation of arm 104 within the aperture. Retention of arm 104 within the aperture can be achieved in any desired fashion including, but not limited to, forming a portion 118 of arm 104 with a diameter larger than the aperture such that upon insertion of the arm through the aperture, the portion 118 abuts the base 102. A nut, lock washer or other suitable attaching device can then be placed over the slotted end of arm 104 and into abutment with an opposite side of the base 102 to hold the arm 104 in place.

Alternately, an exterior periphery of the arm 104 can be configured with threads 122, that mate with threads included in an aperture of the base 102. As such, the arm can be threaded through the aperture in the base 102 up to a point where the slot 108 protrudes from the base 102 sufficiently to receive the belt 112.

An end 114 of the arm 104 is also shaped to mate with a removable handle 116. Those skilled in the art will appreciate that the shape of the end 114 can be configured in any desired manner. For example, the shape can be square or hexagonal, such that when the removable handle 116 is placed about its periphery, the handle locks to the end so that the end can be rotated with rotation of the handle 116. However, exemplary embodiments are not limited to use of a square or hexagonal shape, and any number of shapes will be apparent to those skilled in the art. Regardless of which shape is selected, some mechanism can be provided in order for the handle 116 to lock to the end 114 such that the arm 104 can be rotated.

Figure 1B:
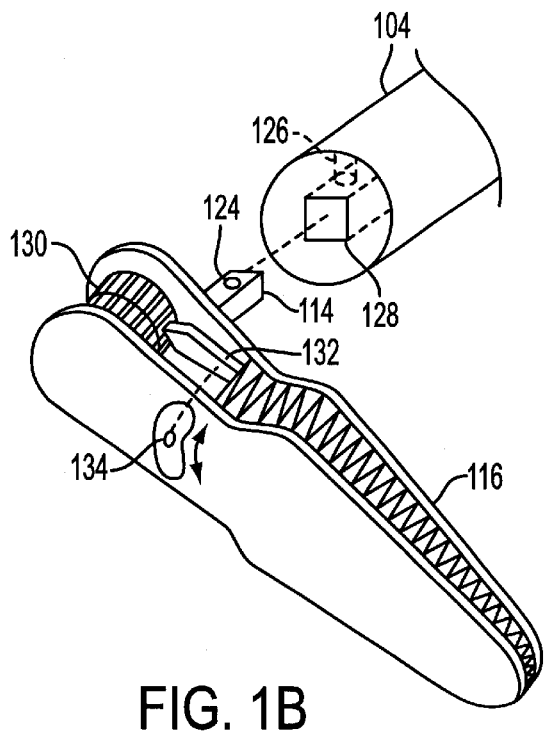

As shown in FIG. 1B, a locking mechanism such as a springbiased ball 124 and recess 126 are provided. For example, the end 114 is formed as part of the handle 116 and extends in a direction toward base 102 for insertion into a mating opening 128 of arm 104. The arm 104 can be a hollow mating cylinder, the hollow opening 128 being shaped to mate with the end 114 (e.g., square shaped). The spring-biased ball can protrude from a peripheral surface of the end 114 to mate with the recess 126 on an inner periphery of the opening 128 in the cylindrically shaped arm 104. Of course, any other suitable locking mechanism can be used.

The handle 116 can include a ratchet wheel 130 and ratchet pawl, or catch, 132 such that arm 104 can be repeatedly rotated to tighten the belt 112 without having to completely rotate the handle 116 by 360°. A lever 134 connected to the catch 132 can be used to vertically shift catch 132 between an upper position at which the handle 116 can be freely rotated in a clockwise direction (that is, to permit rotation of arm 104 in a counterclockwise direction without having to rotate handle 116 by 360°), or in a lower position at which handle 116 can be freely rotated in a counterclockwise direction (that is, to permit clockwise rotation of arm 104 without having to rotate handle 116 by 360°).

The handle 116 can be configured in any of a variety of shapes readily apparent to those skilled in the art, such as a knob or other handle. In the exemplary FIG. 1A and 1B embodiments, a lever is illustrated to provide the user enhanced leverage when rotating the arm 104.

The FIG. 1A apparatus further includes a locking device for selectively retaining the rotatable arm 104 in a fixed rotational position relative to the base 102 after the belt has been tightened to a desired tension. In the FIG. 1 embodiment, the portion of the arm 104 designated 118, which extends from the base 102 toward the handle 116 is configured with exterior threads 122 to receive a nut rotatable about the threads. As such, tightening of a restraining device, such as a belt, strap, rope or the like, can be implemented by threading the restraining device through the slots included in each of the two arms 104 and 106. After the lever 116 has been used to rotate the arm 104 a desired number of revolutions to achieve a desired tension in the belt 112, the nut 120 can be rotated to tighten against the base 102 and hold the arm 104 in a fixed rotational position.

Alternately, where a periphery of the arm 104 is threaded within an aperture of the base 102 as described with respect to an alternate embodiment in FIG. 1, the nut 120 can be backed off the base 102 in a direction toward the handle 116 by a desired amount (for example, by an amount equal to ¼ revolution of the arm 104, or any other desired amount). Upon rotation of the handle 116, the nut 120 will abut against the base 102, thereby retaining the arm 104 in its tightened position. The nut 120 can then be loosened again by the predetermined amount, and the handle 116 used to rotate the arm 104 until the nut 120 again abuts against the base 102. This operation can be repeated until a desired tension has been achieved in the restraining device 112.

Alternately, the nut 120 can be backed off in a direction toward handle 116 to the furthest extent possible. The rotatable arm 104 can then be rotated using the handle 116, until a desired tension is achieved within the restraining device 112. When the lever 116 has been rotated sufficiently to impart a desired tension to the restraining device, the arm 104 can be retained in a fixed rotational position by engaging a locking device, such as the nut 120.

The handle 116 can be optionally removed when not in use to reduce the amount of space required for the apparatus. Those skilled in the art will appreciate that rather than using a nut 120 as illustrated in the exemplary FIG. 1 embodiment, the locking device can be configured as any device suitable for maintaining the arm 104 in a fixed rotational position including, but not limited to a wing nut.

To release tension in the restraining device, the handle, if removed, can be optionally reinserted over the end 114. The nut 120 can be rotated in an opposite direction to release the arm 104. After tension in the restraining device 112 has been released, the belt can be removed from the slots 108 and 110.

The exemplary embodiment of FIG. 1A provides a cost-effective, space-saving design which can be easily installed and operated using, for example, a single hand of the user. By using a locking device, such as the nut 120, a secure locking of the arm 104 in place can be achieved in a manner which complies with all NTSB safety standards. As such, the device is ideal for use with tightening a vehicle seat belt used to hold down a child safety seat, and can be easily operated even when used in difficult to reach places, such as the center location of a rear seat, as shown in FIG. 2.

Figure 2:
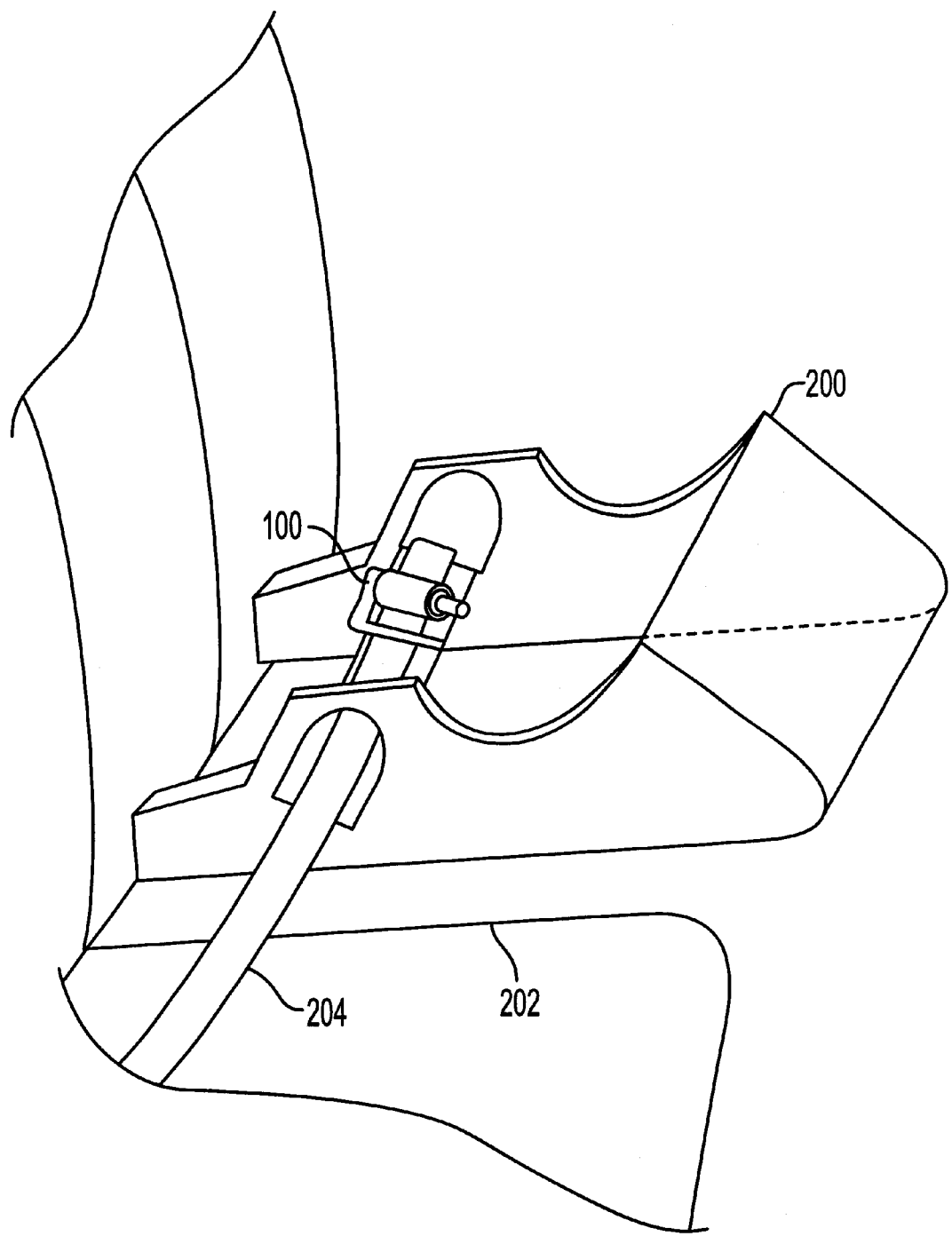
FIG. 2 shows an application of the present invention to a child safety seat.

Referring to FIG. 2, the exemplary FIG. 1A apparatus 100 is used to hold down the base of a child safety seat 200 in a vehicle seat 202. In the FIG. 2 illustration, the lever 116 has been removed following a tightening of the seat belt 204 using the unitary structure 100 of FIG. 1A.

Figure 3:
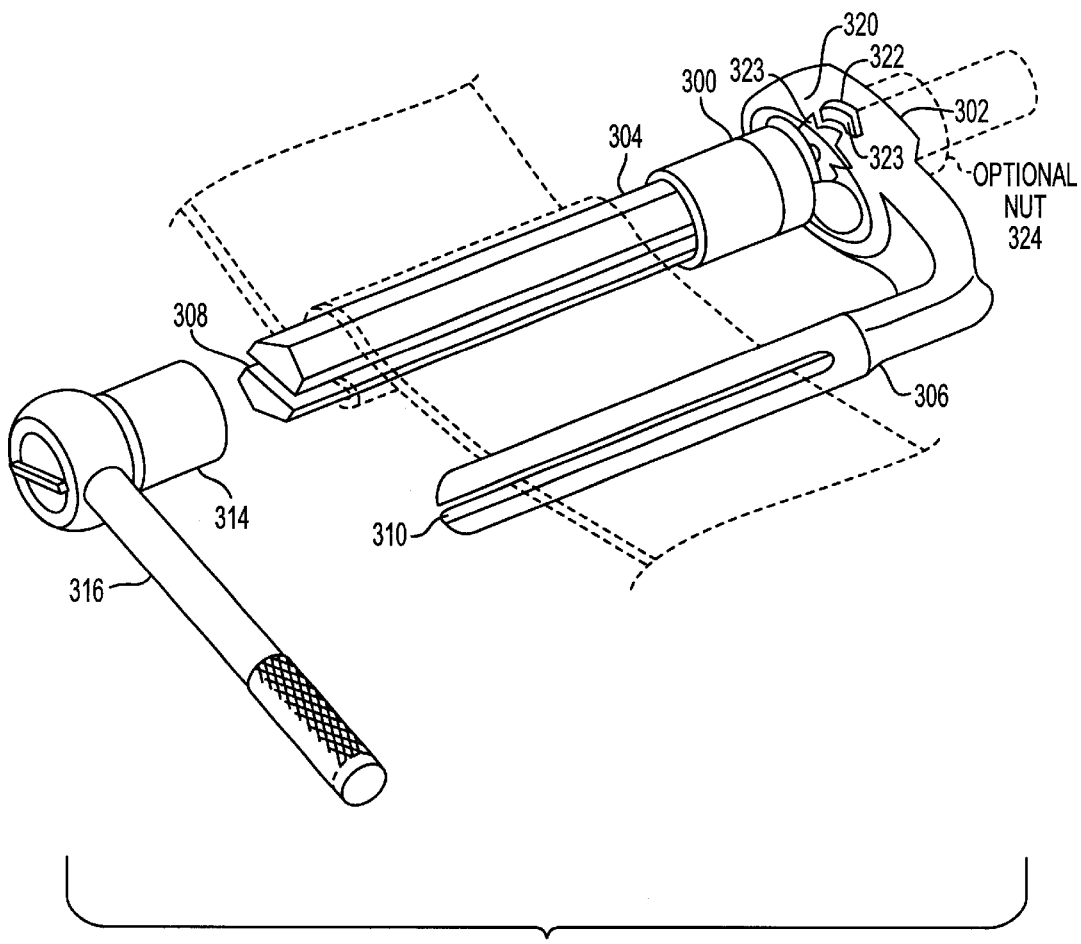
FIG. 3 shows an alternate exemplary embodiment of the present invention.

FIG. 3 shows an alternate exemplary embodiment of the present invention, wherein a unitary structure 300 is again provided which possesses a generally U-shaped configuration formed by a base 302 with two arms 304 and 306. Again, each of the two arms includes a slot 308, 310, respectively, to receive a restraining device, such as a seat belt. The arm 304 is rotatable relative to a remaining portion of the unitary structure.

In contrast to the exemplary Figure 1A embodiment wherein an end of the arm 104 extended through the base 102, in the FIG. 3 embodiment the arm 104 is rotatable within the base 302. The arm 304 can be shaped to mate with a removable handle 316. For example, the arm 304 is configured with a hexagonal shape that mates with a receptacle 314 of the removable handle 316. A ratchet mechanism 320 can be included within the base 302 such that upon rotation, the arm 304 can be retained in a fixed rotational position. The ratchet mechanism 320, upon each partial rotation of the arm 304, includes teeth on a ratchet wheel 323 which engage a ratchet pawl, or catch 322 fixed within base 302 to a pivot 323. Alternately, or in addition, a locking device can be implemented using a nut similar to that described with respect to the FIG. 1A embodiment. In this case, an end of the shaft 304 can be configured to extend through the base 302. A nut 324 can be included to mate with exterior threads on the end of the arm 304, on a side of the base 302 opposite the arm 304, in a manner as described with respect to FIG. 1A.

In operation, the restraining device can be threaded though the slots 308 and 310 of the unitary structure 300. The removable handle 316 can then be used to rotate the arm 304 until a desired tension has been imparted to the restraining device. Where a ratchet mechanism is used, the arm will be retained in place with each rotation thereof. When a nut 324 is used either as an additional locking device or in place of the ratchet, the nut can be backed off only enough that it will abut base 302 with each partial turn of arm 304 or, can be tightened after the desired tension has been achieved.

To release tension in the restraining device, the pivotable locking pin of the ratchet 322 can be released (using for example, a button accessible on the base 302), away from a ratchet wheel 323 of the ratchet 320. The arm 304 can then be freely rotated in a reverse direction to release tension in the restraining device. When a nut 324 has been used, the nut can be rotated to render the arm 304 freely rotatable, such that tension can be released in the restraining device.

Those skilled in the art will appreciate that the unitary structure and removable handle in accordance with exemplary embodiments of the present invention can be configured using any member of materials including, but not limited to plastics, metals, and so forth. Moreover, any combination of the features described in accordance herewith, and any combination of materials, can be used to implement the device.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. Apparatus for tightening a restraining device comprising:
    a unitary structure having a generally U-shaped configuration formed by a base with two arms, each of said arms including a slot to receive a restraining device, at least one of said arms being rotatable relative to a remaining portion of said unitary structure; and
    a locking device for selectively retaining said at least one rotatable arm in a fixed rotational position relative to said base.

2. Apparatus according to claim 1, wherein said at least one arm extends through said base for rotation by a user.

3. Apparatus according to claim 2, wherein an end of said at least one arm is shaped to mate with a removable handle used to rotate said at least one arm.

4. Apparatus according to claim 3, wherein an end of said at least one arm which extends through said base includes exterior threads, said locking device being a nut rotatable about said threads to lock said at least one arm in said fixed rotational position.

5. Apparatus according to claim 1, wherein said restraining device is seat belt.

6. Apparatus according to claim 1, wherein said locking device is a ratchet mechanism.

7. Apparatus according to claim 1, wherein said locking device is a ratchet mechanism in combination with a nut rotatable about exterior threads of said at least one arm.

8. In combination, an apparatus for tightening a restraining device and a removable handle for adjusting tightness of said restraining device, said apparatus comprising:
    a unitary structure having a generally U-shaped configuration formed by a base with two arms, each of said arms including a slot to receive a restraining device, at least one of said arms being rotatable relative to a remaining portion of said unitary structure; and
    a locking device for selectively retaining said at least one rotatable arm in a fixed rotational position relative to said base.

9. Apparatus according to claim 8, wherein said at least one arm extends through said base for rotation by a user.

10. Apparatus according to claim 9, wherein an end of said at least one arm is shaped to mate with a removable handle used to rotate said at least one arm.

11. Apparatus according to claim 10, wherein an end of said at least one arm which extends through said base includes exterior threads, said locking device being a nut rotatable about said threads to lock said at least one arm in said fixed rotational position.

12. Apparatus according to claim 8, wherein said restraining device is seat belt.

13. Apparatus according to claim 8, wherein said locking device is a ratchet mechanism.

14. Apparatus according to claim 8, wherein said locking device is a ratchet mechanism in combination with a nut rotatable about exterior threads of said at least one arm.

15. Method for tightening a restraining device, comprising the steps of:
    threading a restraining device through slots included in each of two arms of a generally U-shaped unitary structure, at least one of said two arms being rotatable relative to a remaining portion of said unitary structure;
    rotating said at least one arm to impart a desired tension to said restraining device; and
    retaining said at least one arm in a fixed rotational position by engaging a locking device.

16. Method according to claim 15, wherein said step of retaining includes a step of:
    tightening a nut to hold said at least one arm in said fixed rotational position relative to said unitary structure.

* * * * *